(12) United States Patent
Lefebvre et al.

(10) Patent No.: US 12,662,948 B1
(45) Date of Patent: Jun. 23, 2026

(54) TURBINE EXHAUST DUCT WITH PROBE INTERFACE

(71) Applicant: PRATT & WHITNEY CANADA CORP., Longueuil (CA)

(72) Inventors: Guy Lefebvre, St-Bruno-de-Montarville (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/038,048

(22) Filed: Jan. 27, 2025

(51) Int. Cl.
| | |
|---|---|
| *F01D 25/30* | (2006.01) |
| *B64D 29/08* | (2006.01) |
| *F02C 3/14* | (2006.01) |

(52) U.S. Cl.
CPC ............. *F01D 25/30* (2013.01); *B64D 29/08* (2013.01); *F02C 3/145* (2013.01); *F05D 2220/323* (2013.01); *F05D 2240/14* (2013.01)

(58) Field of Classification Search
CPC .......... F01D 25/30; F01D 25/26; F01D 25/24; F01D 25/28; B64D 29/08; F02C 3/145; F05D 2220/323; F05D 2240/14
See application file for complete search history.

(56) References Cited

U.S. PATENT DOCUMENTS

| | | | |
|---|---|---|---|
| 7,798,765 | B2 | 9/2010 | Snyder et al. |
| 9,157,334 | B2 | 10/2015 | Grede et al. |
| 9,880,059 | B2 | 1/2018 | Myers et al. |
| 9,969,500 | B2 | 5/2018 | Anderson et al. |

| | | | | |
|---|---|---|---|---|
| 10,514,003 | B2 | 12/2019 | Akcayoz et al. | |
| 10,550,767 | B2 | 2/2020 | Eleftheriou et al. | |
| 11,319,897 | B2 | 5/2022 | Joo et al. | |
| 11,428,122 | B1 * | 8/2022 | Lefebvre ................. | F01D 25/14 |
| 11,859,503 | B1 * | 1/2024 | Lefebvre ............... | F01D 21/003 |
| 11,905,844 | B2 | 2/2024 | Kim et al. | |
| 11,999,501 | B2 | 6/2024 | Joo et al. | |
| 12,065,936 | B2 * | 8/2024 | Lizzer .................... | G01K 1/026 |

(Continued)

FOREIGN PATENT DOCUMENTS

| | | |
|---|---|---|
| EP | 3299592 B1 | 3/2020 |
| EP | 4063620 A1 | 9/2022 |
| EP | 4067625 A1 | 10/2022 |

OTHER PUBLICATIONS

European Search report issued in counterpart application No. 26154176.7 on May 6, 2026.

*Primary Examiner* — Rodolphe Andre Chabreyrie
(74) *Attorney, Agent, or Firm* — NORTON ROSE FULBRIGHT CANADA LLP

(57) ABSTRACT

An exhaust system for an aircraft engine, has: a turbine exhaust duct (TED) having an annular inlet conduit extending around a central axis for directing combustion gases generally in an axial direction, and outlet conduits branching off from the annular inlet conduit; and an exhaust case surrounding the TED, the exhaust case being frustoconical and having outlet openings each communicating with a respective one of the outlet conduits, a probe opening extending through the exhaust case and bounded by a periphery, and a probe interface mounted to the periphery of the probe opening, the probe interface including an interfacing plate secured to the periphery of the probe opening and defining an aperture sized to receive a probe therethrough, the aperture located radially inwardly of the probe opening.

20 Claims, 7 Drawing Sheets

(56) References Cited

U.S. PATENT DOCUMENTS

| | | | |
|---|---|---|---|
| 2014/0366544 A1 | 12/2014 | Maccaul et al. | |
| 2022/0243615 A1 | 8/2022 | Turcotte et al. | |
| 2024/0003262 A1 | 1/2024 | Lefebvre et al. | |
| 2024/0150030 A1* | 5/2024 | Legras | B64D 33/04 |
| 2024/0254942 A1 | 8/2024 | Akcayoz et al. | |

* cited by examiner

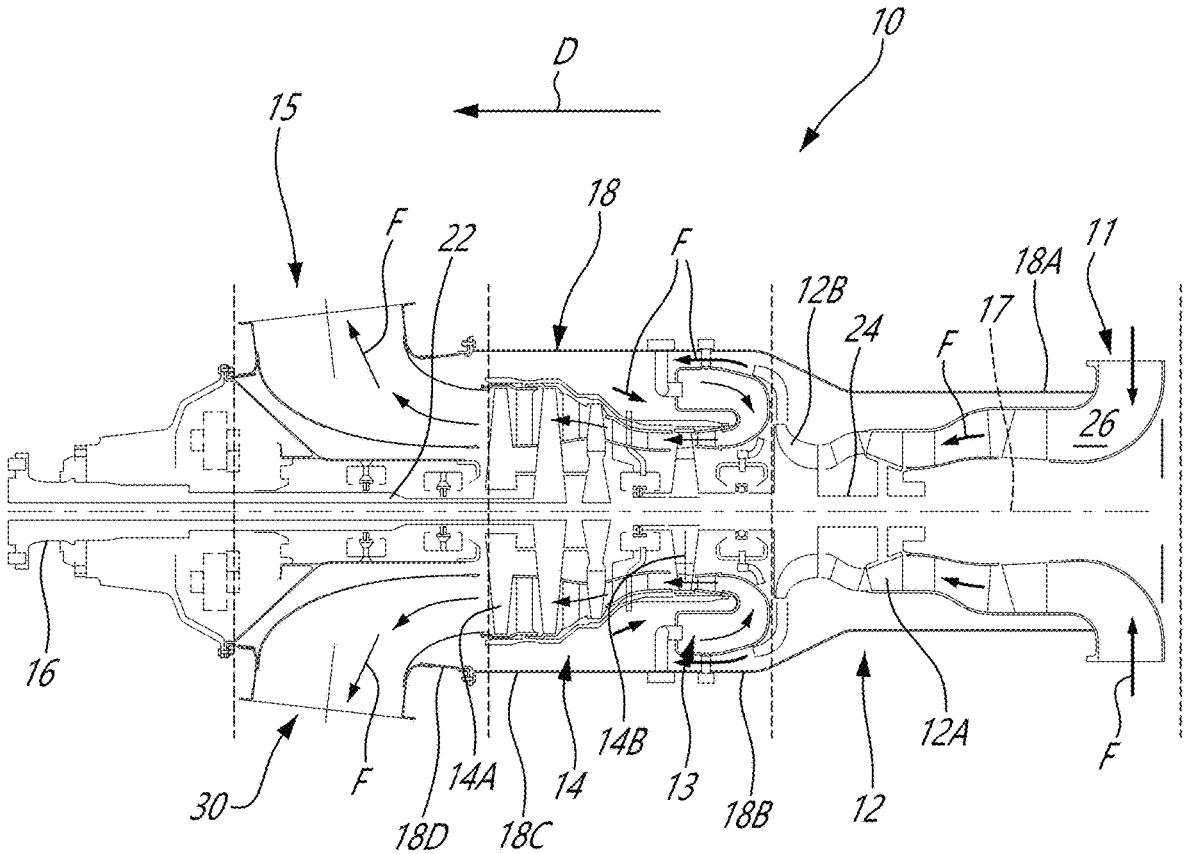
_FIG. 1_

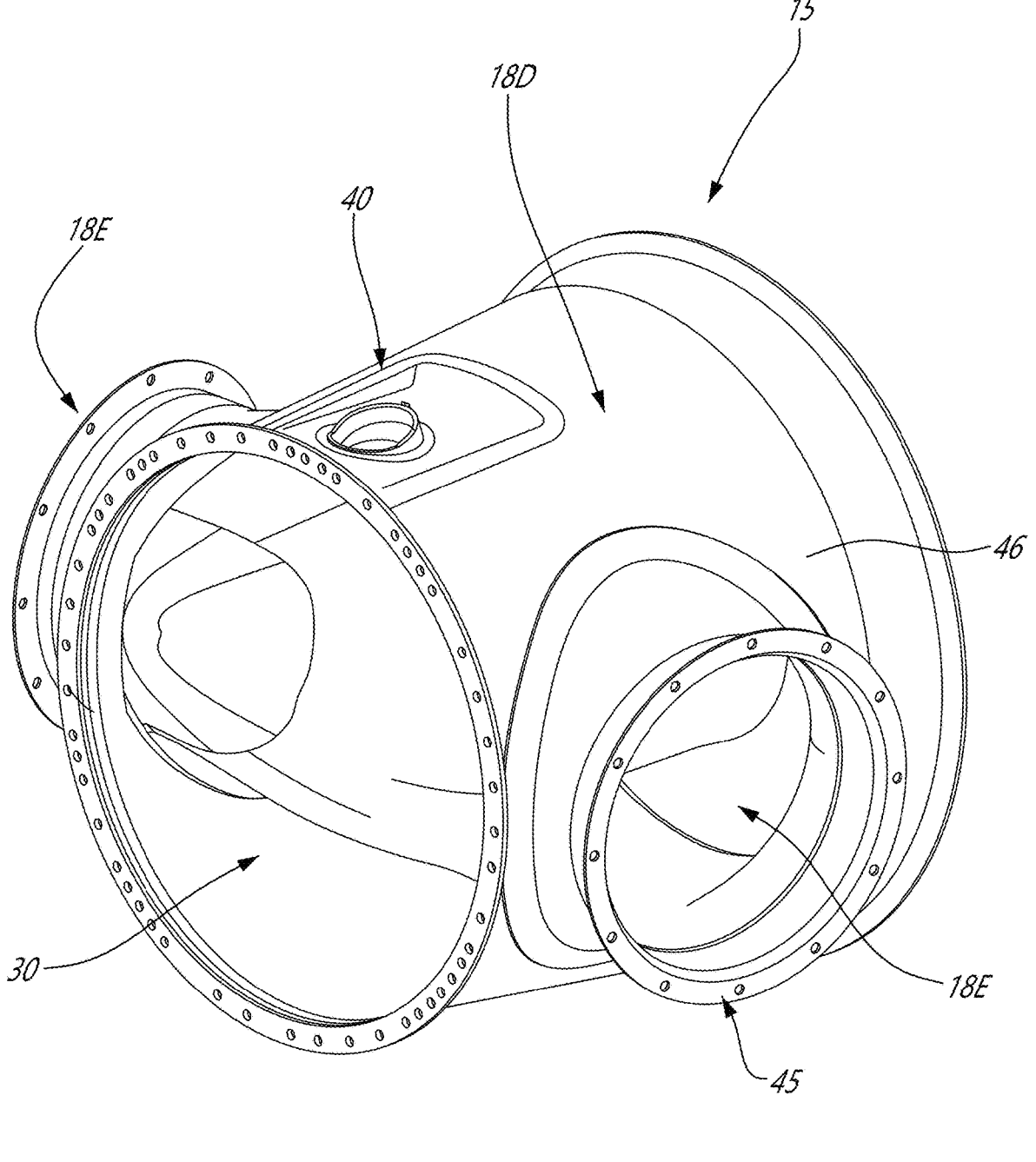
_FIG. 2_

30

34    38    33A

33

35

32

38

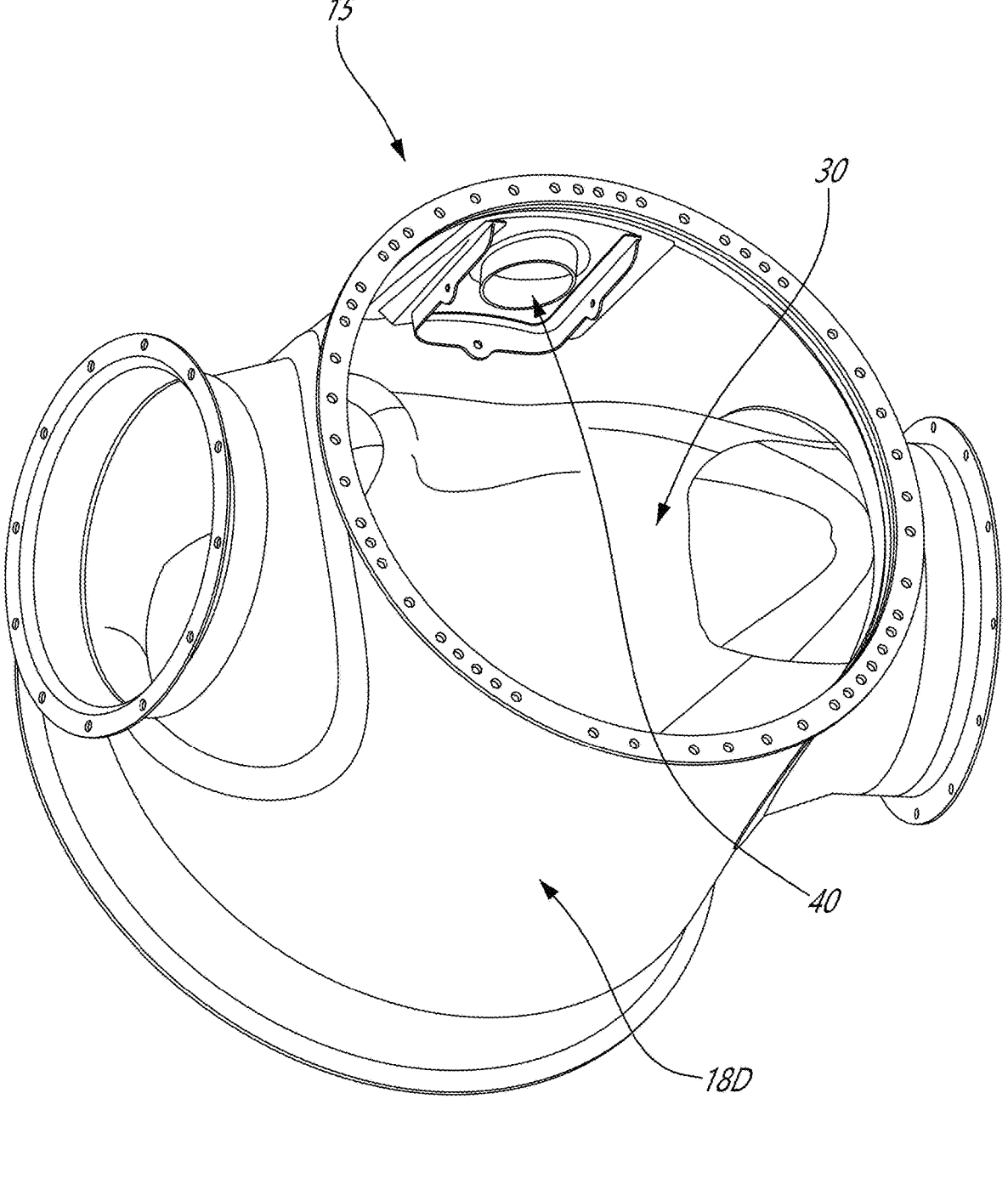
_FIG. 6_

TURBINE EXHAUST DUCT WITH PROBE INTERFACE

TECHNICAL FIELD

The disclosure relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided an exhaust system for an aircraft engine, comprising: a turbine exhaust duct (TED) having an annular inlet conduit extending around a central axis for directing combustion gases generally in an axial direction, and outlet conduits branching off from the annular inlet conduit; and an exhaust case surrounding the TED, the exhaust case being frustoconical and having outlet openings each communicating with a respective one of the outlet conduits, a probe opening extending through the exhaust case and bounded by a periphery, and a probe interface mounted to the periphery of the probe opening, the probe interface including an interfacing plate secured to the periphery of the probe opening and defining an aperture sized to receive a probe therethrough, the aperture located radially inwardly of the probe opening.

The exhaust system described above may include any of the following features, in any combinations.

In some embodiments, the interfacing plate includes: a base defining the aperture; and a flange extending peripherally around the base, the flange being secured to the periphery of the probe opening.

In some embodiments, a radial distance from the base to the central axis is constant along an axial length of the base.

In some embodiments, the flange has a first flange section extending transversally to the base and a second flange section extending transversally to the first flange section and parallel to an outer side of the exhaust case, the first flange section has a radial height relative to the central axis, the radial height increasing along an axial direction relative to the central axis.

In some embodiments, a is stiffener secured to the interfacing plate.

In some embodiments, the stiffener is secured to an inner side of the interfacing plate, the inner side facing the central axis.

In some embodiments, the stiffener has a U-shape and includes a flange contacting the inner side of the interfacing plate and a rib protruding transversally from the flange towards the central axis.

In some embodiments, the stiffener is secured to the interfacing plate via a braze joint or a weld joint.

In some embodiments, the probe opening extends axially up to a mounting flange of the exhaust case.

The In some embodiments, a collar is secured to the interfacing plate at the aperture, the collar sized to receive the probe therethrough.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining outlet openings and a probe opening; a turbine exhaust duct (TED) having an annular inlet conduit extending around the central axis for directing combustion gases generally in an axial direction, and outlet conduits fluidly communicating with the annular inlet conduit and extending generally radially outward relative to the annular inlet conduit, each of the outlet conduits communicating with a respective one of the outlet openings of the outer case; and a probe interface mounted to a periphery of the probe opening, the probe interface including an interfacing plate covering the probe opening and having a portion being recessed radially inwardly relative to the exhaust case and defining an aperture sized to receive a probe therethrough.

The reverse-flow gas turbine engine described above may include any of the following features, in any combinations.

In some embodiments, the portion is defined by a base of the interfacing plate, the interfacing plate further including a flange extending peripherally around the base, the flange being secured to the periphery of the probe opening.

In some embodiments, a radial distance from the base to the central axis is constant along an axial length of the base.

In some embodiments, the flange has a first flange section extending transversally to the base and a second flange section extending transversally to the first flange section and parallel to an outer side of the exhaust case, the first flange section has a radial height relative to the central axis, the radial height increasing along an axial direction relative to the central axis.

In some embodiments, a stiffener is secured to the interfacing plate.

In some embodiments, the stiffener is secured to an inner side of the interfacing plate, the inner side facing the central axis.

In some embodiments, the stiffener has a U-shape and includes a flange contacting the inner side of the interfacing plate and a rib protruding transversally from the flange towards the central axis.

In some embodiments, the stiffener is secured to the interfacing plate via a braze joint or a weld joint.

In some embodiments, the probe opening extends axially up to a mounting flange of the exhaust case.

In some embodiments, a collar is secured to the interfacing plate at the aperture, the collar sized to receive the probe therethrough.

DESCRIPTION OF THE DRAWINGS

Reference is now made to the accompanying figures in which:

FIG. 1 is a schematic cross-sectional view of an aircraft engine depicted as a turboprop gas turbine engine;

FIG. 2 is a three dimensional view of an exhaust system of the aircraft engine of FIG. 1;

FIG. 6 is a bottom three dimensional view illustrating an inner side of the exhaust system of FIG. 2.

DETAILED DESCRIPTION

Figure 3:
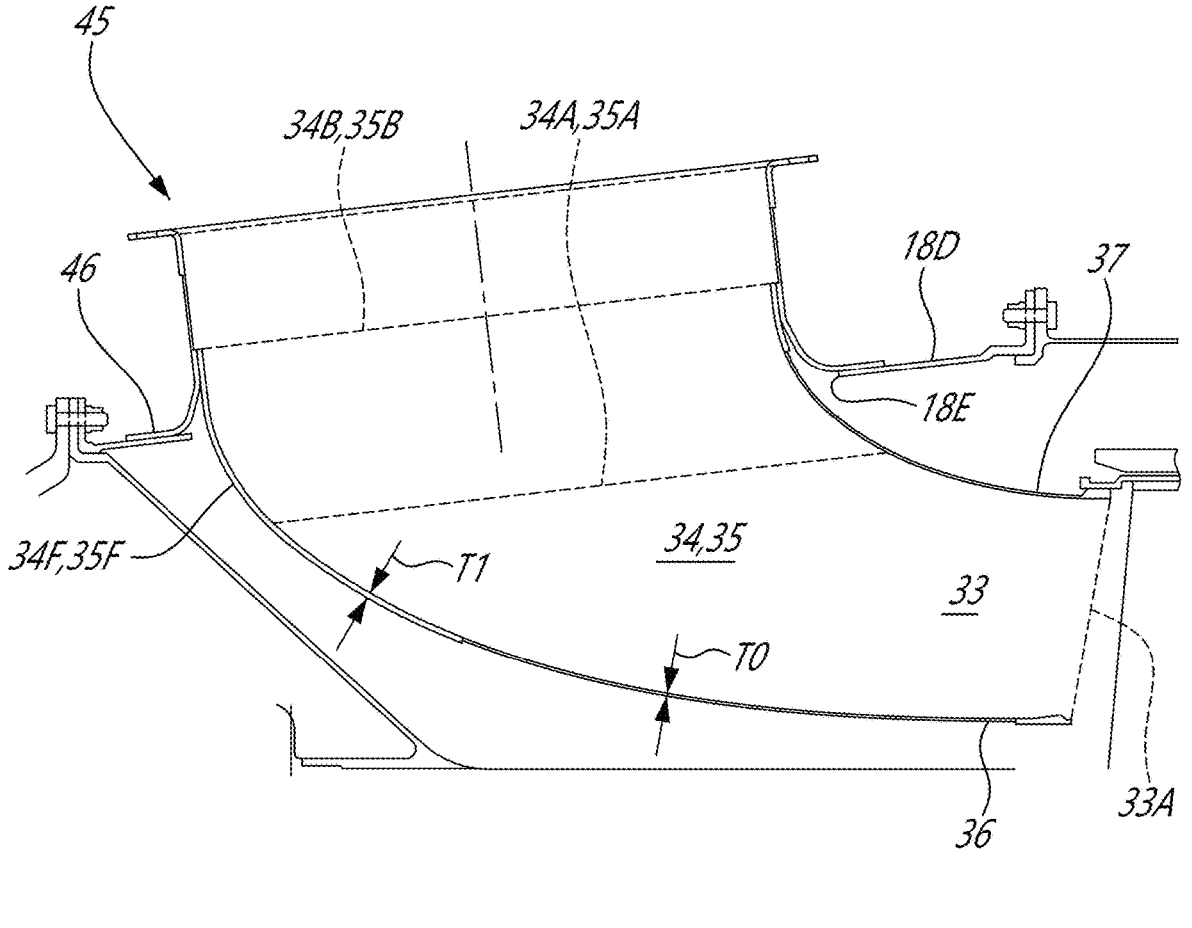
FIG. 3 is a cross-sectional view of the exhaust system of FIG. 2.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

The exhaust case 18D extends from a rear mounting flange connected to the turbine case 18C to a forward mounting flange 18H being axially offset from the rear end. The exhaust case 18D has a frustoconical shape extending circumferentially around the axis. Put differently, a diameter of the exhaust case 18D decreases from the rear end towards to the front end. The openings 18E are defined through the exhaust case 18D between the forward and rear flanges.

As shown in FIG. 2, the exhaust case 18D further includes a probe interface 40 via which a probe may extend through the exhaust case 18D for being operatively connected to a shaft of the gas turbine engine 10. The probe may be a torque probe used to sense a torque generated by the gas turbine engine 10 or any other suitable probes such as temperature or speed sensing probes. The probe interface 40 is located circumferentially between the openings 18E. More detail about this probe interface 40 are provided below.

Figure 4:
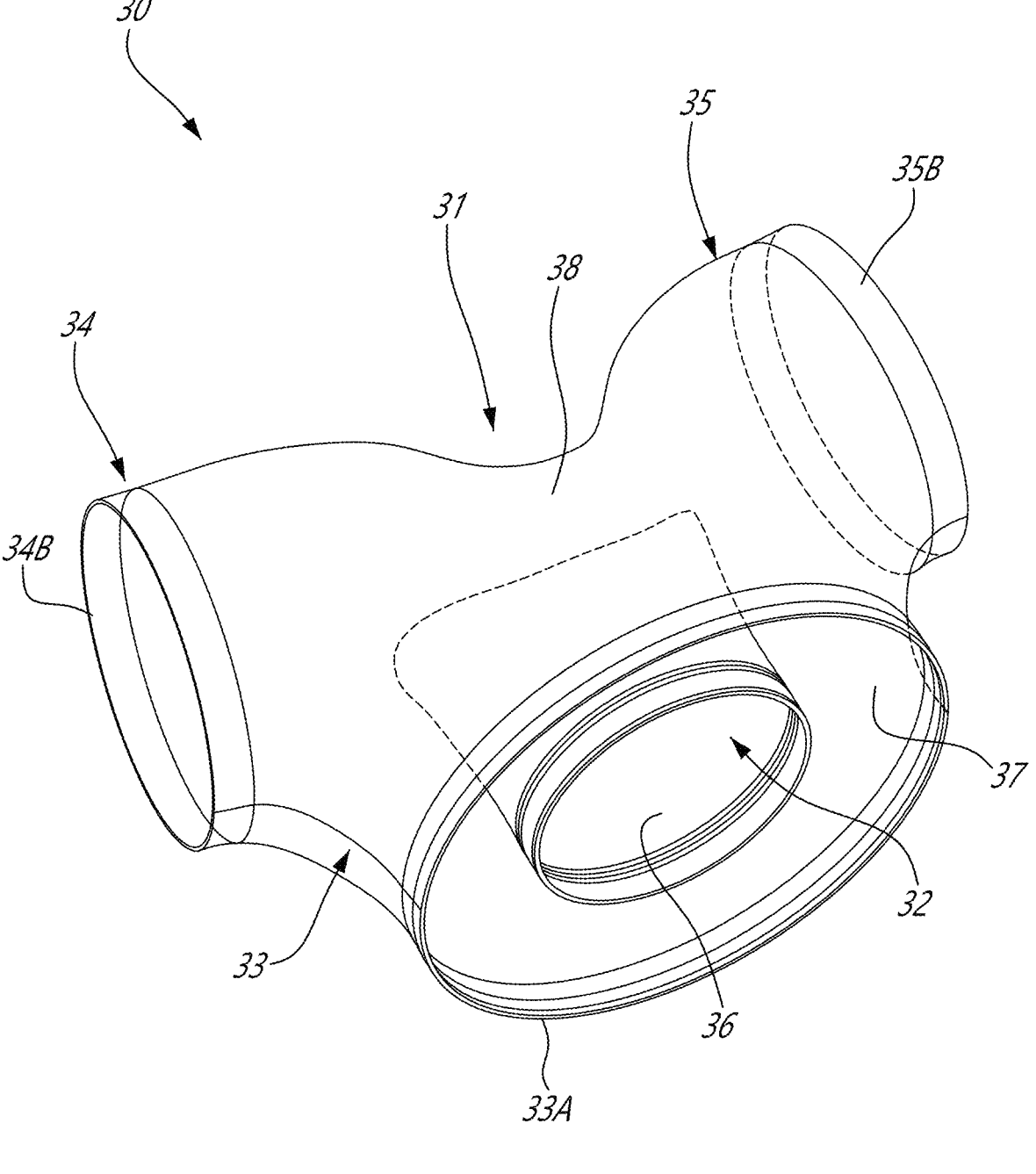
FIG. 4 is a three dimensional view of a turbine exhaust duct of the exhaust system of FIG. 3.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit portion 34, 35 projects outwardly of the exhaust case 18D. As best shown in FIG. 3, each outlet conduit portion 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Figure 5:
FIG. 5 is another three dimensional view of the turbine exhaust duct of FIG. 4.

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Figure 7:
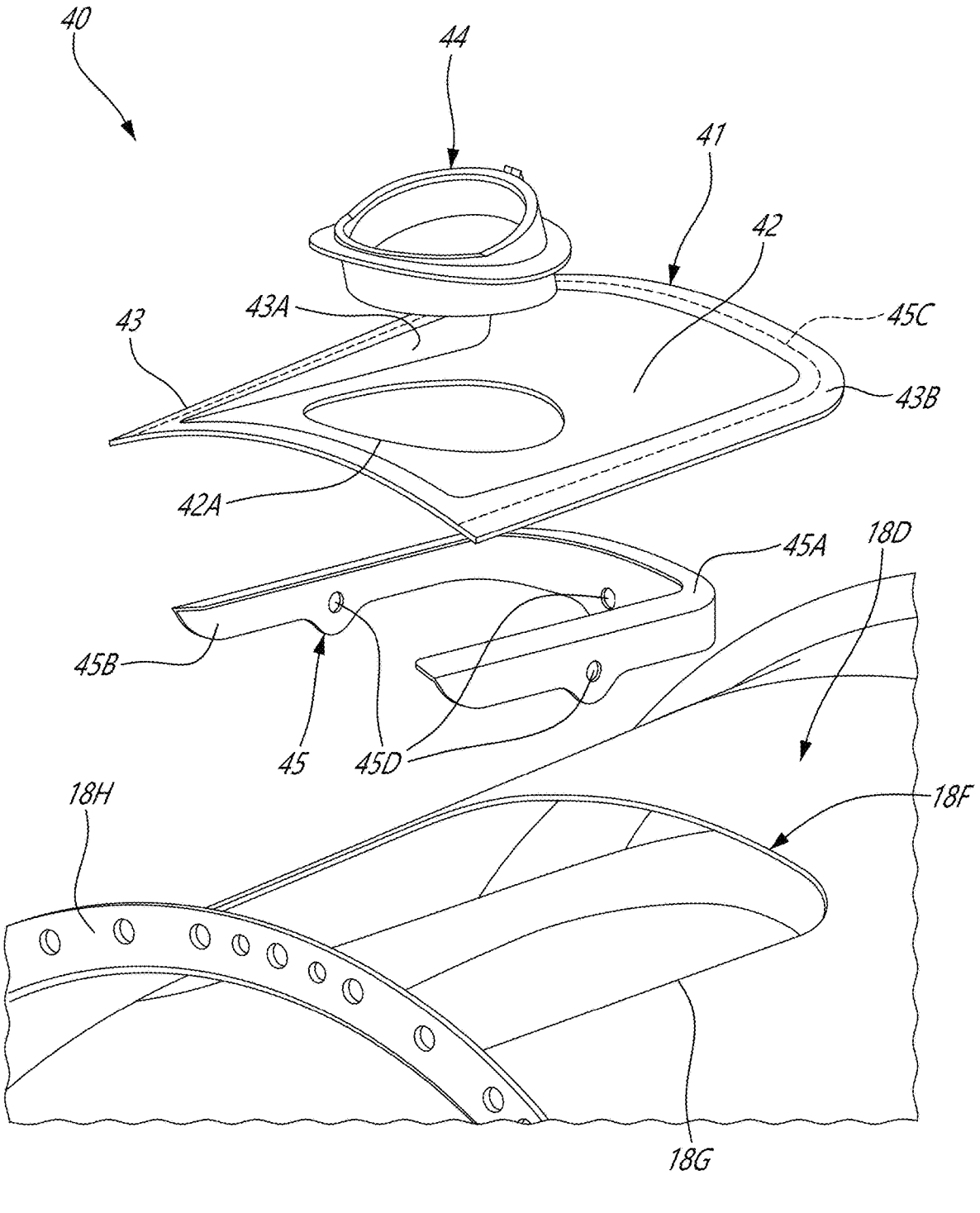
FIG. 7 is a three dimensional exploded view illustrating parts of a probe interface.

Referring to FIGS. 2 and 6-7, the probe interface 40 is described in greater detail. As previously described, the exhaust case 18D has a frustoconical shape that reduces the radial clearance with the airframe nacelle. Hence, it is challenging to design the exhaust case 18D of the gas turbine engine 10 without affecting external torque probe instrumentation. The disclosed exhaust case 18D including the probe interface 40 may avoid modifying the torque sensor interface to maintain the same clearance envelope with the airframe nacelle. Inventors of the present disclosure determined that a mechanical arrangement of the torque sensor may interfere with a profile of the exhaust case 18D, which is now frustoconical instead of cylindrical. It has been found that it may be beneficial to locally interrupt the exhaust case 18D to allow installation of the probe interface 40. However, this interruption in the exhaust case 18D may affect vertical rigidity of the exhaust case 18D. To at least partially alleviate this drawback, the probe interface 40 is installed in the interruption of the exhaust case 18D. As will be seen hereinafter in greater details, the probe interface 40 may include a sheet metal forming comprising a cylindrical shape (i.e. a constant curvature between the opposed axial ends of the sheet metal forming) to allow installation of the torque sensor or any other types of sensors, combined with formed reinforcing ribs. Stiffeners may also be used to further increase rigidity as discussed below.

Referring more particularly to FIG. 7, the probe interface 40 is engaged to the exhaust case 18D at a probe opening 18F defined in a front half portion of the frustoconical body of the exhaust case 18D. In this embodiment, the probe opening 18F extends axially to the forward mounting flange 18H of the exhaust case 18D. Still according to the illustrated example, the probe opening 18F is centrally aligned with the top dead center of the exhaust case 18D. However, other locations are contemplated. The probe interface 40 is mounted to a periphery 18G bounding the probe opening 18F. According to the illustrated example, the periphery 18G defines a generally rectangular perimeter with rounded corners at the rear axial end of the opening 18F.

The probe interface 40 includes an interfacing plate 41 secured to the periphery 18G of the probe opening 18F. The interfacing plate 41 is used to locally change the shape of the exhaust case 18D from a shave where a radial distance from the axis varies in an axial direction to a shape in which the radial distance from the axis is constant in the axial direction. More specifically, the interfacing plate 41 includes a base 42 and a flange 43 extending peripherally around the base 42. A radial distance from the base 42 to the central axis 17 is constant along an axial length of the base taken along the central axis 17. The flange 43 is secured to the periphery 18G of the probe opening 18F. In this embodiment, the flange 43 is brazed or welded to the periphery 18G of the probe opening. In other words, the interfacing plate 41 and the exhaust case 18D are brazed or welded edge-to-edge. Other configurations are contemplated. For instance, an overlap may be defined between the exhaust case 18D and the flange 43 of the interfacing plate 41. A weld or braze joint may be located at this overlap and radially between a portion of the flange 43 and the exhaust case 18D relative to the central axis 17. The base 42 curves from a first side to second side in a circumferential direction and along a constant radius from end-to-end around to the central axis 17. Put differently, the base 42 would be cylindrical if it were to extend fully around the central axis 17. In other words, the base 42 may be contained into a cylindrical plane extending around the central axis 17. Therefore, the base 42 may be non-parallel to the exhaust case 18D.

An aperture 42A is defined through the base 42 and sized to receive a collar 44, which is itself sized to receive a probe as described above. The collar 44 may be a bushing used to provide an interface between the probe and the interfacing plate 41. The collar 44 may have a cylindrical body received through the aperture 42A and having a peripheral flange secured (e.g., welded, brazed) to the base 42 of the interfacing plate 41. In some embodiments, the interfacing plate 41 and the collar 44 may be parts of a single monolithic body.

Since the aperture 42A is defined by the base 42, the aperture 42A is located radially offset, herein radially inwardly, of the probe opening 18F. In other words, the base 42 may be a recessed portion of the interfacing plate 41 being recessed radially inwardly relative to the exhaust case 18D and defining the aperture 42A sized to receive the probe therethrough. This configuration may ensure proper alignment of the probe.

In some embodiments, the flange 43 has a first flange section 43A extending transversally to the base 42 and a second flange section 43B extending transversally to the first flange section 43A and being substantially parallel to an outer side of the exhaust case 18D. The expression "substantially" is meant to encompass slight variations caused by, for instance, manufacturing tolerances and so on. The first flange section 43A has a radial height relative to the central axis 17 that increases along an axial direction relative to the central axis 17. In other words, the interfacing plate 41 may define a recess or pocket whose radial depth increase in an axial direction away from the forward mounting flange 18H. The flange 43 may increase a stiffness of the interfacing plate 41 to at least partially alleviate a stiffness reduction caused by the creation of the probe opening 18F.

In some embodiments, the stiffness of the interfacing plate 41 may be further increased via a stiffener 45 secured to the interfacing plate 41. More than one stiffener may be used. The stiffener 45 may be secured to an inner side of the interfacing plate 41. The inner side faces the central axis 17. In this embodiment, the stiffener 45 has a U-shape and includes a flange 45A contacting the inner side of the interfacing plate 41 and includes a rib 45B protruding transversally from the flange 45A towards the central axis 17. The stiffener 45 may have an open end that faces the forward mounting flange 18H of the exhaust case 18D. The stiffener 45 may be secured to the interfacing plate 41 via a joint 45C that may be a braze joint or a weld joint. In some embodiments, the stiffener 45 and the interfacing plate 41 may be parts of a single monolithic body. The stiffener 45 defines apertures 45D, three in this embodiment but more or less are contemplated, configured for securing internal components of the engine.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:
   a turbine exhaust duct (TED) having an annular inlet conduit extending around a central axis for directing combustion gases in an axial direction, and outlet conduits branching off from the annular inlet conduit; and
   an exhaust case surrounding the TED, the exhaust case being frustoconical and having outlet openings each communicating with a respective one of the outlet conduits, a probe opening extending through the exhaust case and bounded by a periphery on an outer side of the exhaust case, and a probe interface mounted to the periphery of the probe opening, the probe interface including an interfacing plate secured to the periphery of the probe opening and defining an aperture sized to receive a probe therethrough, the aperture located radially inwardly of the probe opening.

2. The exhaust system of claim 1, wherein the interfacing plate includes:
   a base defining the aperture; and
   a flange extending peripherally around the base, the flange being secured to the periphery of the probe opening.

3. The exhaust system of claim 2, wherein a radial distance from the base to the central axis is constant along an axial length of the base.

4. The exhaust system of claim 2, wherein the flange has a first flange section extending transversally to the base and a second flange section extending transversally to the first flange section and parallel to the outer side of the exhaust case, the first flange section has a radial height relative to the central axis, the radial height increasing along an axial direction relative to the central axis.

5. The exhaust system of claim 1, further comprising a stiffener secured to the interfacing plate.

6. The exhaust system of claim 5, wherein the stiffener is secured to an inner side of the interfacing plate, the inner side facing the central axis.

7. The exhaust system of claim 6, wherein the stiffener has a U-shape and includes a flange contacting the inner side of the interfacing plate and a rib protruding transversally from the flange towards the central axis.

8. The exhaust system of claim 6, wherein the stiffener is secured to the interfacing plate via a braze joint or a weld joint.

9. The exhaust system of claim 1, wherein the probe opening extends axially up to a mounting flange of the exhaust case.

10. The exhaust system of claim 1, comprising a collar secured to the interfacing plate at the aperture, the collar sized to receive the probe therethrough.

11. A reverse-flow gas turbine engine, comprising:
   an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining outlet openings and having a probe opening extending through the exhaust case and bounded by a periphery on the outer side of the exhaust case;
   a turbine exhaust duct (TED) surrounded by the exhaust case and having an annular inlet conduit extending around the central axis for directing combustion gases in an axial direction, and outlet conduits fluidly communicating with the annular inlet conduit and extending radially outward relative to the annular inlet conduit, each of the outlet conduits communicating with a respective one of the outlet openings of the outer case; and
   a probe interface mounted to the periphery of the probe opening, the probe interface including an interfacing plate mounted to the periphery and having a portion being recessed radially inwardly relative to the exhaust case and defining an aperture sized to receive a probe therethrough.

12. The reverse-flow gas turbine engine of claim 11, wherein the portion is defined by a base of the interfacing plate, the interfacing plate further including a flange extending peripherally around the base, the flange being secured to the periphery of the probe opening.

13. The reverse-flow gas turbine engine of claim 12, wherein a radial distance from the base to the central axis is constant along an axial length of the base.

14. The reverse-flow gas turbine engine of claim 12, wherein the flange has a first flange section extending transversally to the base and a second flange section extending transversally to the first flange section and parallel to the outer side of the exhaust case, the first flange section has a radial height relative to the central axis, the radial height increasing along an axial direction relative to the central axis.

15. The reverse-flow gas turbine engine of claim 11, further comprising a stiffener secured to the interfacing plate.

16. The reverse-flow gas turbine engine of claim 15, wherein the stiffener is secured to an inner side of the interfacing plate, the inner side facing the central axis.

17. The reverse-flow gas turbine engine of claim 16, wherein the stiffener has a U-shape and includes a flange contacting the inner side of the interfacing plate and a rib protruding transversally from the flange towards the central axis.

18. The reverse-flow gas turbine engine of claim 16, wherein the stiffener is secured to the interfacing plate via a braze joint or a weld joint.

19. The reverse-flow gas turbine engine of claim 11, wherein the probe opening extends axially up to a mounting flange of the exhaust case.

20. The reverse-flow gas turbine engine of claim 11, comprising a collar secured to the interfacing plate at the aperture, the collar sized to receive the probe therethrough.

\* \* \* \* \*